United States Patent [19]
Wallick

[11] 3,744,719
[45] July 10, 1973

[54] PORTABLE LIQUID SPRAY ASSEMBLY WITH BOOM AND NOZZLE

[75] Inventor: Sherwin Wallick, Houston, Tex.
[73] Assignee: Jack L. Wallick, Columbus, Ohio, a part interest
[22] Filed: Oct. 20, 1971
[21] Appl. No.: 190,760

[52] U.S. Cl............... 239/199, 239/165, 169/25
[51] Int. Cl............................................ B05b 9/02
[58] Field of Search............... 239/165, 169, 172, 239/175, 187, 199; 169/25

[56] References Cited
UNITED STATES PATENTS

| | | | |
|---|---|---|---|
| 2,064,278 | 12/1936 | Tappe | 239/165 X |
| 2,144,890 | 1/1939 | Nakaoka | 239/165 X |
| 877,255 | 1/1908 | Tarbell | 169/25 |
| 1,133,631 | 3/1915 | Gerding | 169/25 |

Primary Examiner—Lloyd L. King
Assistant Examiner—John J. Love
Attorney—Donald H. Fidler and Edmund F. Bard

[57] ABSTRACT

An improved spray means is provided which includes a telescopic tubular boom and nozzle assembly mounted on a light-weight two-wheeled carriage adapted to be maneuvered about by one person. A spring-loaded hose reel is mounted of the carriage at the base end of the boom assembly to function generally in the manner of a counterweight, and to supply liquid to the nozzle. A hand-wound cable reel is provided with three cables, one for actuating the nozzle, one to give stability to the extended boom, and one to extend the boom from its retracted condition.

10 Claims, 5 Drawing Figures

PATENTED JUL 10 1973
3,744,719
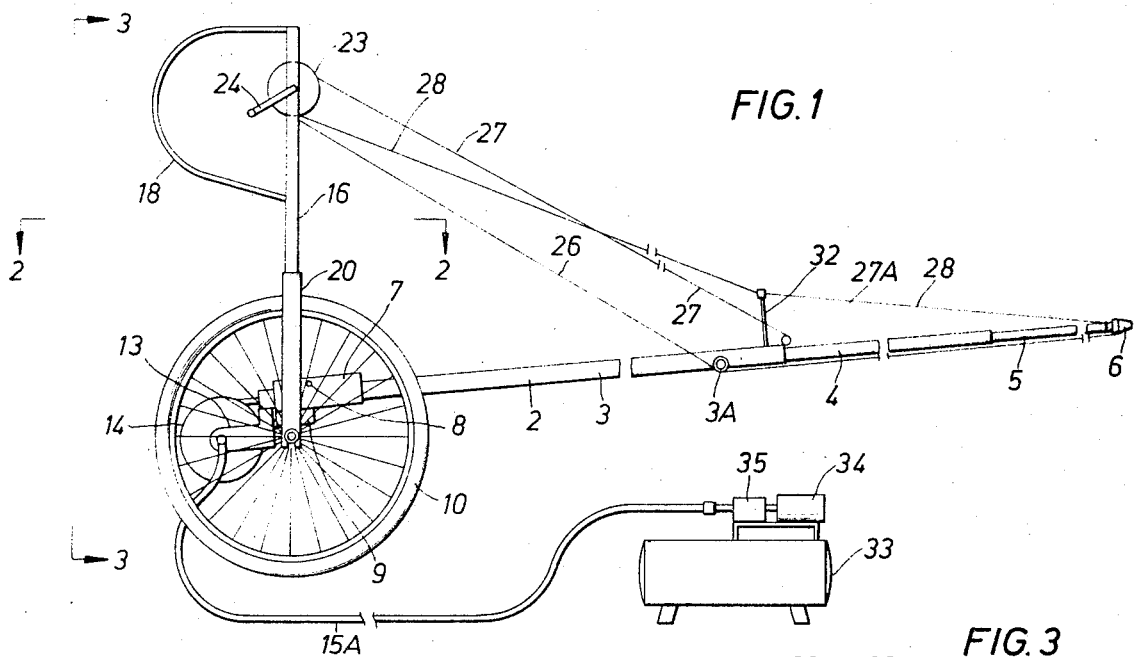
FIG. 1
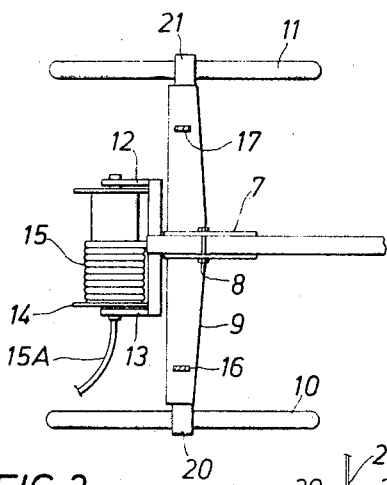
FIG. 2
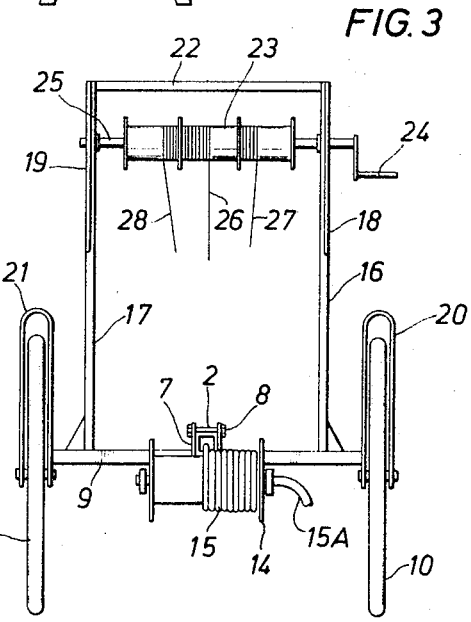
FIG. 3
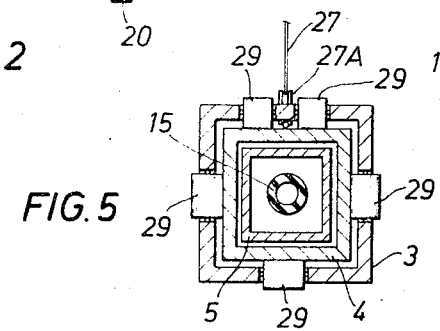
FIG. 5
FIG. 4
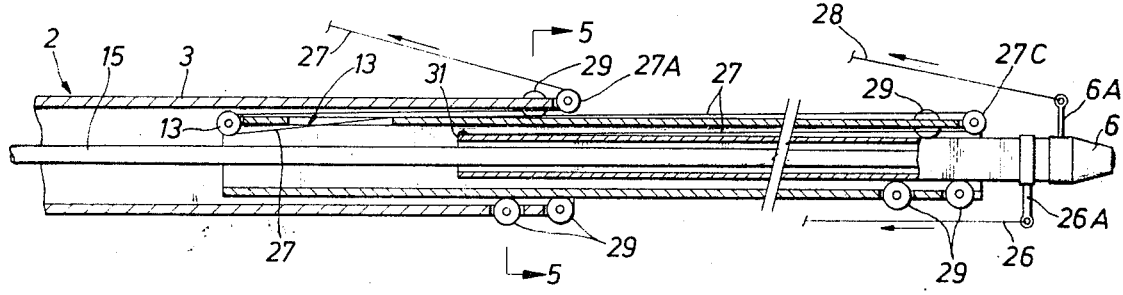

PORTABLE LIQUID SPRAY ASSEMBLY WITH BOOM AND NOZZLE

BACKGROUND OF INVENTION

This invention relates to methods and apparatus for directing a liquid discharge, and more particularly relates to an improved portable hose and nozzle assembly specially adapted to facilitate the discharge of liquid into an inaccessible and relatively elevated location. An ideal use for methods and apparatus embodying the concept of the subject invention is the spraying of insecticides and fungicides, and the like, into the upper branches of relatively tall trees.

It is well known that trees growing on a residential tract-size lot are usually highly prized by the resident and/or owner of the property, regardless of whether the trees in question provide fruit, nuts, or merely a degree of shade. What is not often understood, is that in many instances where the trees have achieved a sizable growth, the actual provable economic value of these trees may be equal to the basic sales value of the lot in question.

Unfortunately residential shade trees, and especially mature trees which have reached a substantial size and height, are surprisingly vulnerable to attack by insects, fungi and other natural perils. Since these trees are frequently of the greatest value, there has developed an industry of substantial size which is devoted to treatment and protection of trees. There are many techniques for treating insect and fungus attacks and the like, but a common and extremely useful process is to spray the trunk, limbs, and leaves of the tree with a suitable liquid having defensive and/or therapeutic properties. In almost every case, however, it is important to completely spray every above-ground portion of the tree, including the upper limbs and top leaves which, unfortunately, are usually quite inaccessible.

The inaccessibility of the top areas of such trees can be better understood, if it is appreciated that few nurserymen care to climb a tree while carrying a heavy assembly of tanks, hoses and nozzle, and fewer property owners are willing to accept the damage which is done to the tree when it is climbed under these circumstances. On the other hand, it is inconvenient to bring a truck-and-boom assembly into the backyard of the average residence, which is where such trees are usually to be found.

In view of the long-standing character of this problem, there have been many attempts to provide a boom-type spray assembly, which is both light-weight and yet capable of reaching the top of the average tree of mature size. However, no such equipment has ever been made available on a commercial basis, which was sufficiently portable and light-weight so as to be maneuverable by one man operating alone, and which was also capable of effectively reaching the top of the tree.

These and other disadvantages of the prior art are overcome with the present invention, and novel methods and apparatus are provided herewith for facilitiating the discharge of liquid into an elevated and relatively inaccessible location. Accordingly, it will be appreciated that apparatus embodying the concept of the present invention will have a wide range of useful applications, and will be especially applicable to purposes such as fire fighting and the like, wherein maneuverability and portability is especially important.

SUMMARY OF INVENTION

In an especially ideal form of the present invention, a two-wheeled rig is provided wherein a three-piece telescopic boom is fixedly mounted at one end. Accordingly, the wheels are preferably large-diameter, whereby the boom can be pivoted about the axle of the wheels to elevate the nozzle or discharge end of the boom. Moreover, upright members are preferably mounted vertically on or at the axle, and with handholds at the upper ends and shoulder-high to the operator of the equipment. Hence, the nozzle-end of the boom can easily be elevated by rotating the handholds downward about the widest possible radius which may also be convenient to easy maneuverability of the equipment.

The boom is preferably composed of three tubular sections, each slidably disposed, and one within another, in the manner of an extendible telescope. Thus, the boom can be retracted while the equipment is being maneuvered about, and extended when it is desired to send a stream of insecticide or the like into the uppermost reaches of a tree.

A nozzle of suitable design is preferably fixed to the outer end of the most extendible portion of the boom, and is preferably of the type suitable to be actuated by a cable or the like. Liquid is preferably supplied to the equipment by a hose which is disposed in the boom, and which has one end coupled to the nozzle and the other end connected to a suitable pump and liquid supply. However, the bulk of the hose is preferably wound about a spring-loaded reel which may conveniently be mounted at the base end of the boom to function, at least in part, as a counterweight to the nozzle end of the boom. Accordingly, the hose and reel are preferably coupled together whereby extension of the boom will unwind hose from the reel and draw it up the extended boom, and whereby the spring-loaded reel will wind in the hose when the boom is retracted.

A three-drum reel is preferably mounted above the wheels and between the two handholds, to support the three cables which are required to handle the boom. One cable preferably extends to the shutoff means on the nozzle, and thus the nozzle is preferably opened to discharge fluid, by applying a relatively small tension to this nozzle control cable while maintaining a relative slack condition on the other two cables.

The second or boom control cable is passed in and about the sections of the boom, whereby drawing in this cable will cause the sections of the boom to telescopically extend, one out of another, until the boom achieves its maximum length. The third or boom bracing cable is passed through a cable bracket mounted fixedly on the end of the base or butt section of the boom, and extends to and is fastened to the nozzle end of the outer section of the boom. Its function is to provide support to the boom while it is extended, and to keep it from developing a whip such as may be expected when any slender wand-like member of considerable length is required to be swung about to and fro.

It will be apparent that the second cable is expected to travel oppositely to the first and third cables. In other words, whenever the boom control cable is wound onto its portion of the three-drum reel, extension of the boom will tend to unwind the other two cables which are both attached to the outer tip of the boom. It is essential to the purposes of this equipment, however, that all of these cables be manually payed out and reeled in by the operator of the equipment.

As will hereinafter be explained in detail, however, this problem of the present invention is resolved by merely winding the second or boom control cable onto its portion or section of the three-drum reel in a direction opposite to that in which the other two cables are wound onto their respective portions of the reel. Accordingly, when the reel is revolved in one direction, the second cable will be wound onto the drum while the first and third cables are payed out with the extending boom. On the other hand, when the reel is revolved in the other direction, this will wind in the first and third cables while unwinding the second cable.

In one embodiment of the invention, the hose reel may be springloaded only heavily enough to permit the hose reel to wind in the hose as the boom is retracted by other means or methods. Accordingly, the boom may be conveniently retracted by elevating its outer end, and then by permitting the sections of the boom to slide into each other as the cable reel is revolved to wind in the brace cable. Alternatively, winding in the brace cable will itself tend to draw in the boom. In another embodiment, the springloaded hose reel may be the means for retracting the boom.

When the boom is extended for use, the cable reel is preferably locked by some suitable means such as a ratchet and pawl, or by some other fastener of conventional design. Thereupon, the nozzle can be conveniently opened to discharge liquid into the tree, by merely pulling slightly on the nozzle cable while the locked cable reel maintains the other two cables in their fixed condition.

The pump and supply of insecticide or the like may conveniently be mounted on the boom equipment which is the subject of the present invention. However, apparatus of this character tends to be relatively massive, and it is desirable to keep the weight of the boom assembly to a minimum. Accordingly, it is preferable to assemble the pump and liquid supply into a separate assembly which is preferably interconnected with the boom assembly only by an umbilical section composed of a length of hose. One end of this hose may conveniently be coupled to the hose wound on the hose reel, by means of a fitting of suitable design which is mounted, for example, in the hub of the hose reel, and the other end will, of course, be coupled to the pump.

These and other features and significant aspects of the present invention will become apparent from the following detailed description, wherein reference is made to the figures in the accompanying drawing.

IN THE DRAWING

FIG. 1 is a pictorial side view of the basic components of a portable hand-operated and maneuvered nozzle and boom assembly corresponding generally to the description hereinbefore provided, and embodying the concept of the present invention.

FIG. 2 is a pictorial overhead view of certain more significant portions of the apparatus depicted in FIG. 1.

FIG. 3 is a pictorial rearward view of other significant portions of the apparatus depicted in FIGS. 1 and 2.

FIG. 4 is a pictorial view, partly in cross section, of the details of a part of the boom portion of the apparatus depicted more generally in FIGS. 1 and 2.

FIG. 5 is also a pictorial view, largely in cross section, of the apparatus depicted in FIG. 4.

DETAILED DESCRIPTION

Referring now to FIG. 1, there may be seen a side view of a portable boom and nozzle assembly embodying the concept of the present invention, and constructed generally according to the description hereinbefore given. More particularly, the assembly may be seen to be composed of a telescopic boom assembly 2 having its rearward or butt end slidably cradled in a U-shaped channel member 7, and being further composed of a first or lower tubular member 3, an intermediate tubular member 4 which is slidably disposed in the first tubular member 3, and an outer tubular member 5 which is slidably disposed in the intermediate tubular member 4 and which has a nozzle 6 of suitable design mounted at one end. Accordingly, the boom assembly 2 is extendable by providing for each of the tubular members 3–5 to be slidably extended out of each other, and is retractable by having each of these tubular members 3–5 collapsibly slide into each other.

Referring now to FIG. 2, there may be seen an overhead view of a portion of the rig which is depicted in FIG. 1, and more particularly that portion which includes the channel member 7 and the portion of the first tubular member 3 which is slidably disposed therein. As will be further apparent, the channel member 7 is sized so as to snugly fit about the tubular member 3, and a tie or adjustment bolt 8 is preferably provided across the top of the tubular member 3, and through the upward walls of the channel member 7, whereby the walls of the channel member 7 may be tightened to grip the sides of the tubular member 3. Accordingly, it is in this manner that the boom assembly 2 is secured to the rest of the rig depicted in FIG. 1.

Referring again to FIG. 2, the channel member 7 may be seen to be fixedly secured to a horizontally arranged frame member 9 having a pair of large-diameter wheels 10 and 11 rotatably mounted within U-shaped brackets 20 and 21 which are mounted on the ends of the frame member 9. In addition, a pair of angle-shaped support brackets 12 and 13 are preferably mounted on the rearward end of the tubular member 3 to rotatably support a springloaded hose reel 14. In such an arrangement, the entire boom assembly 2 including the hose reel 4, hose 15, and nozzle 6, can be lifted out of the channel member 7 and completely removed from the carriage without the necessity of interrupting fluid discharge, and with no disassembly of the equipment except for removal of the bolt 8.

Referring now to FIG. 3, the rig which is depicted in FIGS. 1 and 2 may be further seen to include a pair of support members 16 and 17 vertically mounted on the upper side of the frame member 9, and equally spaced on opposite sides of the channel member 7 and boom assembly 2. A suitable brace 22 may be included at the upper ends of the support members 16 and 17 to maintain a proper spacing, and also to serve as an auxiliary handhold for maneuvering the rig.

Referring again to FIGS. 1 and 3, there may be seen to be a pair of rearwardly directed handles 18 and 19 each mounted on the upper portion of one of the two support members 16 and 17, and preferably positioned about shoulder-high to the operator of the rig. In addition, a three-drum cable reel 23 is preferably fixedly secured to a shaft 25 which is rotatably secured between the two support members 18 and 19, and generally parallel to the frame member 9. A hand crank 24 may conveniently be attached to the shaft 25 for the purpose of manually revolving the three-drum reel 23, and thus the shaft 25 is preferably mounted between the two handles 18 and 19, where the crank 24 will be convenient to the operator of the rig.

Referring again to FIGS. 1 and 3, the three-drum cable reel 23 may be seen to support three separate cables 26–28. However, each of these three cables 26–28 may be seen to be wound about a different portion of the three-drum cable reel 23, for purposes which will hereinafter be explained.

Referring again to FIG. 1, it will be seen that the boom bracing cable 26 extends from the reel 23, to and through a grommet or other suitable guide means 3A fixedly secured at or near the outer end of the first or base tubular member 3, and thence along the intermediate and outer tubular members 4 and 5 to the bracket 26A which is fixedly attached adjacent the nozzle 6 and depicted in FIG. 4. The nozzle control cable 28, which is also attached at one end to its respective drum portion of the three-drum cable reel 23, may be seen to extend through a grommet or guide portion of a cable bracket 32 mounted at or near the end of the first tubular member 3, and thence to the nozzle control arm 6A which is also depicted in FIG. 4.

As may also be seen in FIG. 1, the boom extension cable 27 is wound onto its respective drum portion of the three-drum cable reel 23 in a direction opposite to the winding of the boom bracing cable 26 and the nozzle control cable 28. Accordingly, however, the boom extension cable 27 extends to and is passed over, a pulley or other suitable bearing means 27A which is fixedly secured in a rotatable manner to the outer edge of the first tubular member 3. As will hereinafter be discussed with respect to FIG. 4, the boom extension cable 27 then is passed back and forth along the various sections of the boom assembly 2, whereby the tubular members 3–5 are caused to telescopically extend when the boom extension cable 27 is wound onto the three-drum cable reel 23 by revolving the hand crank 24.

Referring now to FIG. 5, there may be seen a cross sectional representative of the tubular members 3–5 which compose the boom assembly 2, and more particularly showing these components in a partially extended condition. Thus, rollers 29 or other conventional bearing means may be seen to be provided at various locations, in order to permit the intermediate tubular member 4 to be slidably moved in and out of the first tubular member 3 without there occurring any binding between abutting surfaces, and whereby the outer tubular member 5 may also be slidably drawn in and out of the intermediate tubular member 4 without causing such binding. The hose 15, which is wound upon the hose reel 14, may be seen to be extended axially through the various tubular members 3–5 to connect with the nozzle 6.

Referring now to FIG. 4, the boom extension cable 27 may be seen in this representation of the present invention, to be directed back into the base tubular member 3 after it has been passed over the pulley 27A, and from there, it is passed over a second pulley 27B and run into the lower or near end of the intermediate tubular member 4. As will be apparent to those of skill in this art, it is necessary for the boom extension cable 27 to be positioned adjacent the outer surface of the intermediate tubular member 4, in order for it to be properly coupled to the outer tubular member 5. Accordingly, it may be seen in FIG. 4, that, after the boom extension 27 is passed over the pulley 27B and is directed into the interior of the intermediate tubular member 4, it is passed through a suitable aperture or slot 30 to extend along the exterior surface of the intermediate tubular member 4 until it is again passed over a third pulley 27C. After passing over the pulley 27C, the boom extension cable is then passed down the interior surface of the intermediate tubular member 4 and along the exterior surface of the outer tubular member 5, until it reaches and is fastened to the near or base end of the outer tubular member 5 by any suitable fastener 31. Accordingly, if the three-drum cable reel 23 is wound or revolved by the crank 24 so as to pay out the boom bracing cable 26 and nozzle control cable 28, it will accordingly wind in the boom extension cable 27. It will tend to draw the base or butt end of the intermediate tubular member 4 towards the outer end of the first tubular member 3, and it will further tend to draw the base end of the outer tubular member 5 towards the outer end of the intermediate tubular member 4, to thereby "extend" the boom assembly 2. On the other hand, rotation of the three-drum cable reel 23 in the opposite direction, will permit unwinding or pay-out of the boom extension cable 27, during collapse or retraction of the various sections of the boom assembly 2.

It is a feature of the present invention that the boom bracing 26 and nozzle control cable 28 be unwound or payed-out at the same rate that the boom extension cable 27 is wound onto the reel 23 during extension of the tubular members 3–5 of the boom assembly 2. As hereinbefore stated, the nozzle is normally closed, and thus discharge of liquid from the nozzle 6 is preferably accomplished by applying tension to the nozzle control cable 28. During normal rotation of the reel 23, the nozzle control cable 28 is not subjected to the amount of tension which is sufficient to displace the nozzle control arms 6A and open the nozzle 6. However, when the boom assembly 2 has been extended to the desired length, the three-drum cable reel 23 may be immobilized by some suitable means of conventional design, and the operator of the depicted rig may then open the nozzle 6 by merely applying the small amount of required tension to the nozzle control cable 28 by merely pulling it slightly with his hand.

Referring now to FIG. 5, there may be seen a pictorial representation, substantially in cross section, of the various components of the boom assembly 2 depicted in FIG. 4. More particularly, it may be seen that each of these tubular members 3–5 may be rectangular in cross-sectional configuration, and that the hose 15 may be longitudinally positioned along the axis of the entire boom assembly 2. As may further be seen, the various rollers or bearings 29 which are mounted at the outer end of the base tubular member 3, may be positioned on all four sides of the base tubular member 3 to prevent binding in any direction between it and the intermediate tubular member 4. In addition, it will be apparent in FIG. 5 that the pulley 27A is preferably mounted at the upper edge of the base tubular member 3, as indicated in both FIG. 1 and FIG. 4.

As hereinbefore stated, it is preferable that the supply liquid to be discharged through the nozzle 6 be contained in an assembly which is separate and distinct from the portable boom and nozzle assembly which is the subject of this invention. Referring now to FIG. 1 again, there may be seen an exemplary supply of liquid, which is composed of a suitable tank 33 coupled to a pump 35 which, in turn, is actuated by any suitable means such as an electric or gas-powered motor 34. The pump 35 is coupled to the nozzle 6 by means of a suitable hose 15A of conventional design, and appropriate to this purpose. It should be noted that the hose 15A which interconnects the pump 35 is probably not appropriately the same hose 15 which extends from the hose reel 14 to the nozzle 6. This is because the hose 15 is preferably wound about the reel 14, and is fixedly connected to a suitable fitting at the end of the axis or shaft which supports the hose reel 14. Thus, the umbilical hose 15A will preferably be connected to this fitting for delivery of liquid from the tank 33 into the hose 15 wound on the reel 14.

Various other modifications and embodiments will suggest themselves from a consideration of the methods and apparatus described herein and depicted in the accompanying drawing. Accordingly, it should be clearly understood that the forms of the present invention illustrated in the drawing and described herein are exemplary only, and are not intended as limitations on the present invention.

What is claimed is:

1. A spray assembly adapted to be manually maneuverable for discharging a fluid stream into an elevated relatively inaccessible location, comprising
    a two-wheeled carriage means,
    a first tubular member mounted in boom-like manner on said carriage means to be elevated and depressed by pivotal movement of said carriage means on its wheels,
    a second tubular member at least partially inserted in said first tubular means and outwardly slidable therein away from said carriage means,
    a third tubular means at least partially inserted in said second tubular means and outwardly slidable therein away from said carriage means,
    a normally closed nozzle means mounted on the end of said third tubular member opposite said carriage means,
    a flexible hose slidably disposed in said third tubular member and having its discharge end connected to said nozzle means and its receiving end located adjacent said carriage means,
    a first bracing cable interconnected to maintain the relative rigidity of said tubular members when extended one out of another in boom-like manner,
    a second nozzle-actuating cable extending along said tubular members and connected to said nozzle means,
    a third boom-control cable interconnected with said tubular members, and
    a single cable reel means interconnected with said first, second and third cables for winding in said third cable and drawing said second tubular member from said first tubular member and said third tubular member from said second tubular member while synchronously paying out said first and second cables.

2. The assembly described in claim 1, wherein said first and second cables are wound in one direction onto said cable reel means and said third cable is wound in the opposite direction thereon.

3. The assembly described in claim 2, further comprising a hose reel means rotatably mounted on said first tubular member perpendicularly and oppositely to said tubular members,
    said receiving end of said hose being wound at least partially about said hose reel means.

4. The assembly described in claim 3, wherein said cable reel means is provided with three separate drum portions each being windably interconnected with a different respective one of said three cables.

5. The assembly described in claim 4, further comprising a first upright support member mounted on said carriage means adjacent one of its wheels and presenting a handhold portion at substantially a shoulder-high elevation, and
    a second upright support member mounted on said carriage means adjacent the other of its wheels and also presenting a handhold portion at substantially a shoulder-high elevation,
    said cable reel means being rotatably mounted between said upright support members adjacent said handhold portions.

6. The assembly described in claim 5, further comprising
    actuating means interconnected between said nozzle means and said second cable and adapted to open said nozzle means in response to a preselected tension in said second cable.

7. The assembly described in claim 6, wherein said carriage means further includes
    a U-shaped channel member slidably disposed about the end of said first tubular member adjacent said carriage means and having upwardly thrust side portions, and
    locking means interconnected with said channel member for clamping said side portions thereof into gripping engagement with said first tubular member.

8. The assembly described in claim 7, wherein said locking means includes
    bolt means inserted perpendicularly through said upwardly thrust side portions of said channel member and above said slidably inserted end of said first channel member.

9. The assembly described in claim 8 wherein said hose reel is spring-loaded to wind on said hose during retraction of said third tubular member into said second tubular member and said second member into said first tubular member.

10. The assembly described in claim 9, wherein said second tubular member is provided with a slot-like wall aperture,
    wherein said first cable is wound in one direction onto one of said drum portions of said cable reel means and having its other end slidably extended along the extended end of said first tubular member and fastened to said third tubular member adjacent said nozzle means,
    wherein said second cable is wound in said same one direction onto another different one of said drum portions of said cable reel means and having its other end fastened to said actuating means, and
    wherein said third cable is wound in the opposite direction onto a third different one of said drum portions of said cable reel means and having its other end threaded into said extended end of said first tubular member to and into the near inserted end of said second tubular member and thence through said aperture therein for extension along the exterior of and into the further end of said second tubular member,
said other end of said third cable being further threaded in a reverse manner back into said second tubular member and along the exterior surface of said third tubular member and fixedly secured to the inserted near end of said third tubular member opposite said nozzle means.

* * * * *